United States Patent [19]
Haas

[11] Patent Number: 5,693,355
[45] Date of Patent: Dec. 2, 1997

[54] COMPOSITE PASTRY MOLD AND BAKED GOODS PRODUCTION PROCESS

[76] Inventor: Nada Haas, Wildpretmaria 1/12, A-1010, Vienna, Austria

[21] Appl. No.: 571,854

[22] PCT Filed: Jun. 16, 1994

[86] PCT No.: PCT/AT94/00077

§ 371 Date: Dec. 13, 1995

§ 102(e) Date: Dec. 13, 1995

[87] PCT Pub. No.: WO95/00023

PCT Pub. Date: Jan. 5, 1995

[30] Foreign Application Priority Data

Jun. 17, 1993 [AT] Austria ................................ 1192/93

[51] Int. Cl.⁶ .......................... A21C 11/00; A21D 8/00
[52] U.S. Cl. ....................... 426/523; 99/383; 99/442; 425/438; 425/422; 425/443; 426/512
[58] Field of Search .......................... 426/523, 139, 426/512; 99/383, 442; 425/438, 443, 422, 416

[56] References Cited

U.S. PATENT DOCUMENTS

| | | | |
|---|---|---|---|
| 1,342,045 | 6/1920 | Hamwi | 426/523 |
| 1,438,541 | 10/1922 | Mc Laren | 426/391 |
| 1,576,202 | 3/1926 | Mc Laren | 426/389 |
| 3,947,212 | 3/1976 | Griner | 99/442 |
| 4,651,634 | 3/1987 | Barton | 99/383 |
| 5,352,111 | 10/1994 | Selbak | 425/422 |

FOREIGN PATENT DOCUMENTS

| | | |
|---|---|---|
| 2 646 323 | 11/1990 | France . |
| WO 92 10938 | 7/1992 | WIPO . |

*Primary Examiner*—George Yeung
*Attorney, Agent, or Firm*—Herbert Dubno

[57] ABSTRACT

A baking mold for baking goods includes an upper movable and substantially conical part provided with independently slidable guide part which has a plurality of steam vents providing a free passage for the steam upon displacing the upper part into a lower part while baking the goods.

8 Claims, 4 Drawing Sheets

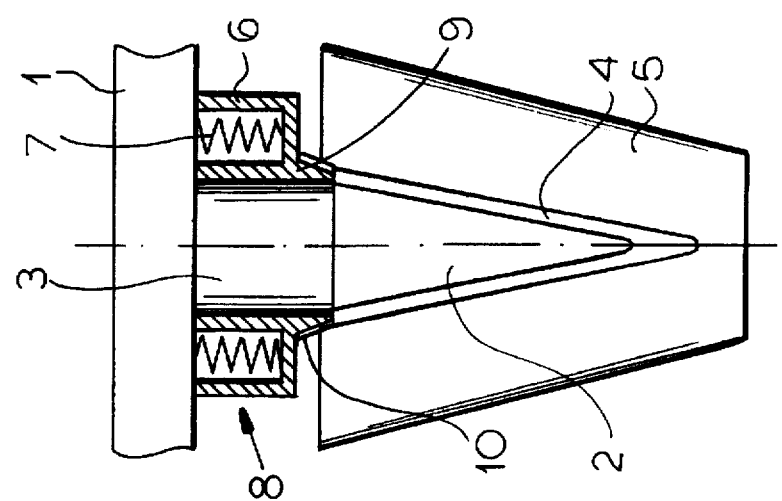
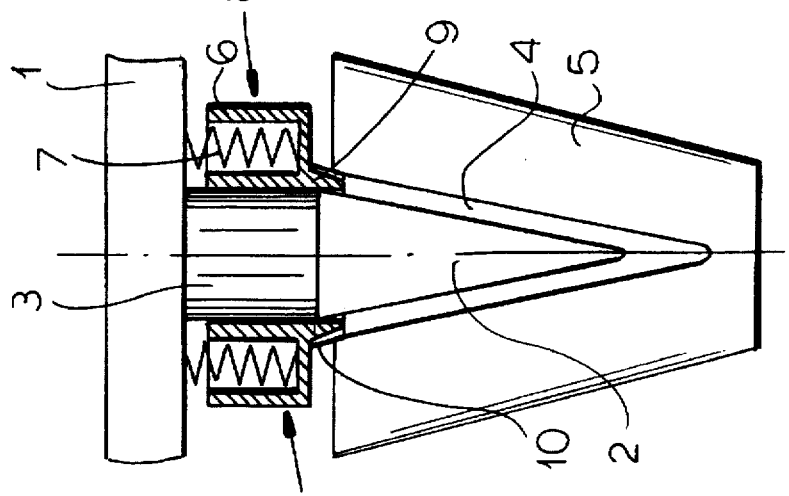
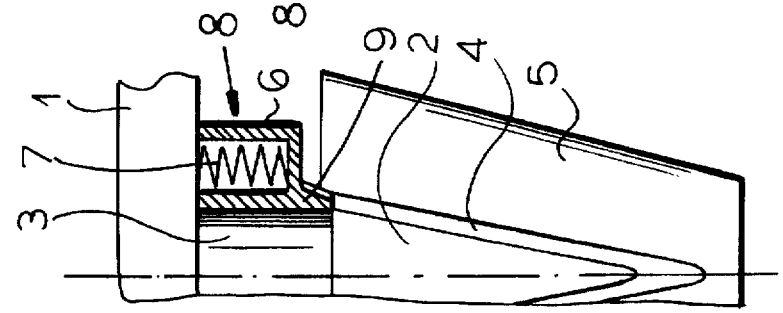
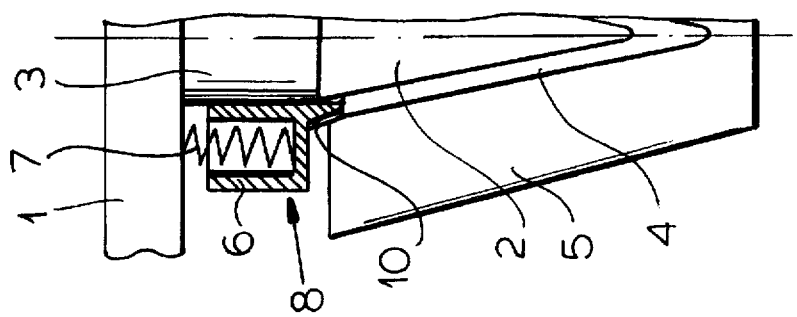

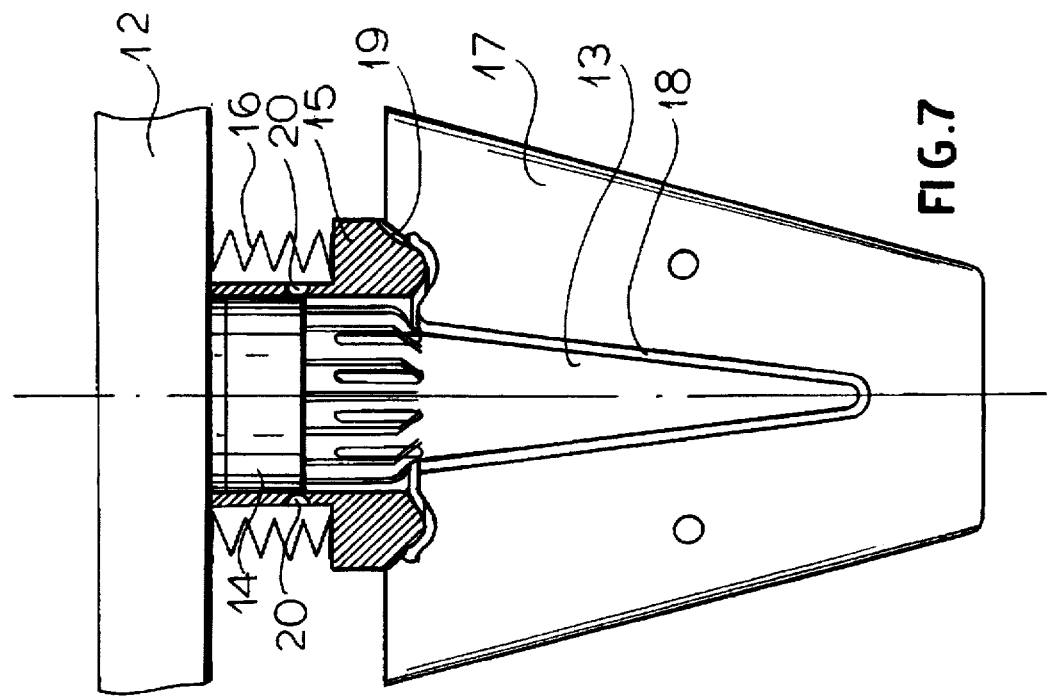
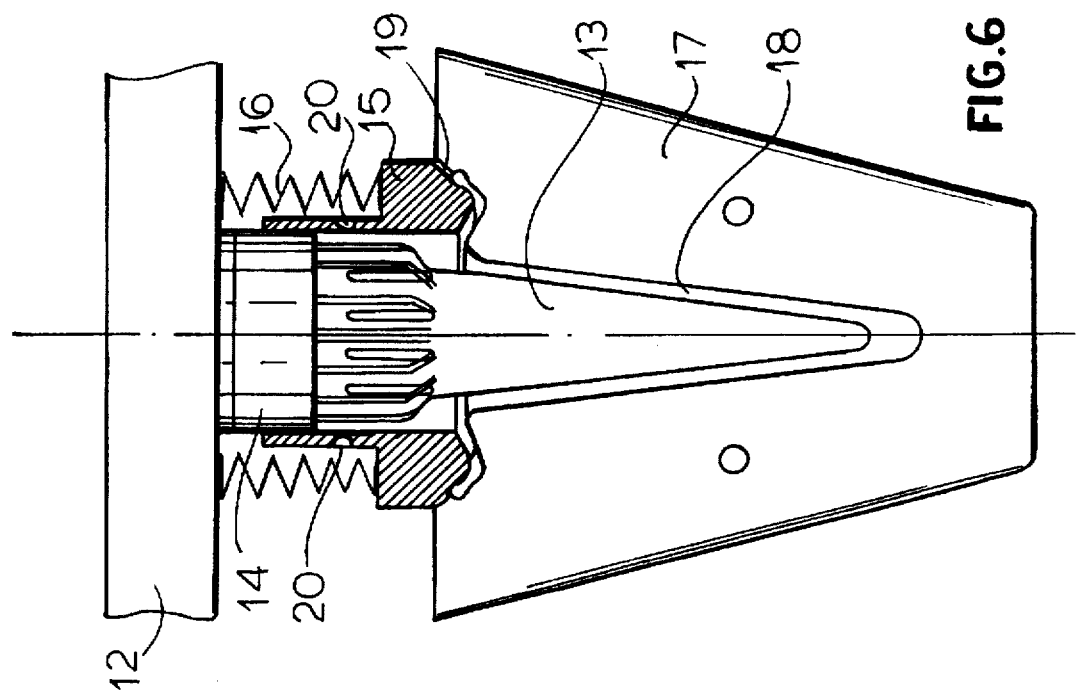

COMPOSITE PASTRY MOLD AND BAKED GOODS PRODUCTION PROCESS

CROSS REFERENCE TO RELATED APPLICATION

This is a national phase application of PCT/AT 94/00077 filed 16 Jun. 1994 and based, in turn, on Austrian application A1192/93 filed 17 Jun. 1993 under the International Convention.

The invention concerns a composite pastry mould for the production of baked goods from wafer dough or the like, such as edible ice-cream cones or ice-cream cups.

BACKGROUND OF THE INVENTION

For the industrial production of ice-cream cones or ice-cream cups from wafer dough or a similar baking mixture, baking moulds are known in which a number of conical mold cores projecting from the mold plate of an upper part of the mold enter the conical recesses of a lower part of the mold. When the conical recesses have been filled with liquid wafer dough, the heated mold is closed and reopened several times, such that steam and dough residues escape and the mold at this phase of the baking process is not entirely filled, so that color variations can be seen on the outside of the end product. Finally, the mold is closed for the last time and the product, for example an ice-cream cone, is baked. To obtain a solid end product, the sugar content of the dough is usually increased. However, this tends to cause the product to adhere to the mold, which can lead to problems during extraction. Cleaning of the baking mold is also laborious, since before the final closing of the mold a relatively large amount of dough escapes from it, having been squeezed out during the repeated opening and closing.

OBJECTS OF THE INVENTION

The aim of the present invention is to design a composite baking which is easy to fill. Another object of the invention is to provide the mold which produces virtually no waste due the escape of dough from the mold. Still another object of the invention is to provide the mold which enables the dough to be distributed at once throughout the hollow space of the mold resulting in compact and solid baked products with a uniform color.

SUMMARY OF THE INVENTION

The baking mold according to the invention includes a ring shaped mould component, which surrounds a cylindrical section of the mold designed as a guide cylinder and located between the foot of the conical mold core and the mold plate to which the latter is attached. Further the shaped mold component can move relative to the mould core and is held against the bottom part of the mold by a force exerted by compression springs resting at one end against the mold plate which forms the top of the mold, and at the other end against shoulders that are part of the ring-shaped mold component. The ring-shaped mould component surrounding the mold core is pushed down by spring pressure to close the mold in the manner of a lid, even before the mold core reaches its final position in the lower part of the mold. This gives ideal conditions for a homogeneous distribution of the dough mass, effectively preventing any uncontrolled escape thereof, and preserving short ventilation channels or steam vents in the plane separating the ring-shaped mold component, or its front end, and the lower part of the mold. It is advantageous for the ring-shaped mould component, at the front, i.e. the side facing the lower part of the mold, to conform in shape around its circumference with the outer shape of the edge of the baked product, for example the lip of an ice-cream cone, and for it to close off the lower part of the mold when the lower and upper parts are brought together, especially if at least one steam vent is preserved. The ring-shaped component is the upper closure of the baking mold, and its front face has the "negative" shape of the lip of the ice-cream cone or similar baked product. When the mold is closed, the wafer dough squeezed towards the mouth of the mold is particularly well compacted in this area, which is a very favourable feature since it is the lip of an ice-cream cone that is most severely stressed. To avoid penetration of the wafer dough into the steam vents, it is advantageous if, in at least one part of the mold, at least one steam vent is provided some distance away from the separation plane, designed so that it can be closed off—especially at a different moment in time with respect to the closing of the mold itself. Shortly before the mold core reaches its final position in the lower part of the mold, this steam vent closes so that no wafer dough can be squeezed into the steam vent channel and the upper part of the mold also becomes completely filled with dough. This is particularly important when a steam vent is located some way away from the separation plane of the mold, since the cleaning of such areas is problematic and cannot easily be automated. The closing of the steam vent can be timed in accordance with the progress of the baking process.

Besides the usual conical ice-cream cones or ice-cream cups, recently ones have been developed which have a collar-type, dish-like drip catcher some distance below the aperture into which the ice-cream is placed. For baked products of such special designs the baking mould conforming to this invention is particularly well suited. In this case the mould is characterized in that the lower part of the mold is split axially and has a recess in conforming in shape to the outside of the lower part of the ice-cream cone including, in the area of the mold separation plane, the shape of the underside of a dish-shaped drip catcher projecting radially between the lower and upper parts of the mould, and is also characterized in that the front face of the ring-shaped mold component conforms in shape to the upper side of the ice-cream cone's dish-shaped drip catcher, while the inside of the ring surface conforms in shape to the outside of the upper part of the ice-cream cone. Here, it is advantageous if the ring-shaped mold component has at least one closeable steam vent, in particular a sharp-edged hole with a conical aperture in the area of the ice-cream cone's mouth, and if, on the mold core directly attached to the mold plate and around which the mouth of the ice-cream cone is formed, or on the guide cylinder attached thereto, a surface is formed which makes contact with the inner surface of the ring-shaped mould component and, when the mold is fully closed and the mold core is pushed all the way down against the pressure of the springs acting on the ring-shaped mold component, slides over the said inner aperture of the steam vent. In particular, the outer surface of the guide cylinder located between the mold plate and the conical part of the mold core can slide over the inner apertures of the steam vents, and so close them off. This prevents any wafer dough from penetrating into the channels of the steam vents, whereby the mold is kept completely filled with dough because the dough displaces any air present in the mold through the steam vents. To avoid seizing between the parts of the mold that slide over one another, it is advantageous if the ring-shaped mould component and the mould core with its guide cylinder are made from different materials, for example brass and steel.

When the baking process is finished, the upper part of the mould is lifted off in the usual way, i.e. the mold core is raised and the lower part of the mold is split to allow removal of the product. Here, it is advantageous if the ring-shaped mould component serves to hold the ready ice-cream cone temporarily in place in the lower part of the mold during the step-wise opening of the mold, i.e. while the mold core is being withdrawn. This prevents the finished product from sticking to the mold core and being lifted out of the mold together with it.

To obtain a baked product that is internally homogeneous, uniformly colored, and that corresponds exactly to the shape of the mold, a production process is proposed which uses the composite baking mold described above, and is characterized in that once the lower part of the mold has been filled with wafer dough, the upper and lower parts of the mold are brought together until the ring-shaped mold component rests under spring pressure against the opening of the lower part of the mold and closes off that opening, and in that then, if needs be after a pre-bake of 10 seconds for example, the mold core is pushed through the ring-shaped mold component and down into the lower part of the mold until it reaches a position giving a gap width corresponding approximately to the final well thickness of the finished baked product, preferably for a period of 1 to 4 seconds, and in that the mould core is then withdrawn to a position corresponding to a gap width between twice and three times the wall thickness of the finished baked product and, while it is in this position, the baking process of approximately 100 seconds in the case of an ice-cream cone is carried out, and in that the mold core is then again pushed down to the position corresponding to the final wall thickness, the baked product being compacted thereby, and final baking is carried out for 60 seconds, for example, and finally the upper and lower parts of the mold are separated, during which the ring-shaped mould component holds the baked product in place in the lower part of the mold while the mould is being opened, until the distance between the upper and lower parts of the mold becomes greater than the travel path of the ring-shaped mold component along the mold core, after which the lower part of the mold is split along a plane of symmetry so that the baked product can be removed or ejected. Once the baking mold has been closed off by the ring-shaped mold component, a sudden plunging insertion of the core as far as its end position in the lower part of the mold forces the wafer dough reliably into the very remotest corners of the mold, and a subsequent first baking stage with the mold core drawn back to allow an oversize wall thickness stabilizes the dough. The mold core is then pushed back to its final position, so compacting the baked product, and final baking is carried out. Appropriate selection of the compaction ratio and adjustment of the baking times before and after the final compaction can control the strength of the finished product very well. Thus, the process is also suitable for the production of biodegradable containers and so-called "edible" packs.

BRIEF DESCRIPTION OF THE DRAWING

The above and other objects, features, and advantages will become more readily apparent from the following description, reference being made to the accompanying drawing in which:

FIG. 2a is a cross-sectional view of the mold in a closed position thereof, but with the mold core partly retracted;

FIG. 2b is a cross-sectional view of the mold in the closed position thereof, but with the mold core fully pushed in;

FIG. 3 is a cross-sectional view of the mold with the mold core fully retracted;

FIG. 4 is a cross-sectional view of the mold with the mold core fully pushed in;

FIG. 6 is a cross-sectional view of the mold shown in FIG. 5 with the mold core seen in an intermediate position; and FIG. 7 is a cross-sectional view of the mold seen in FIG. 5 with the core mold fully pushed in.

SPECIFIC DESCRIPTION

Figure 1:
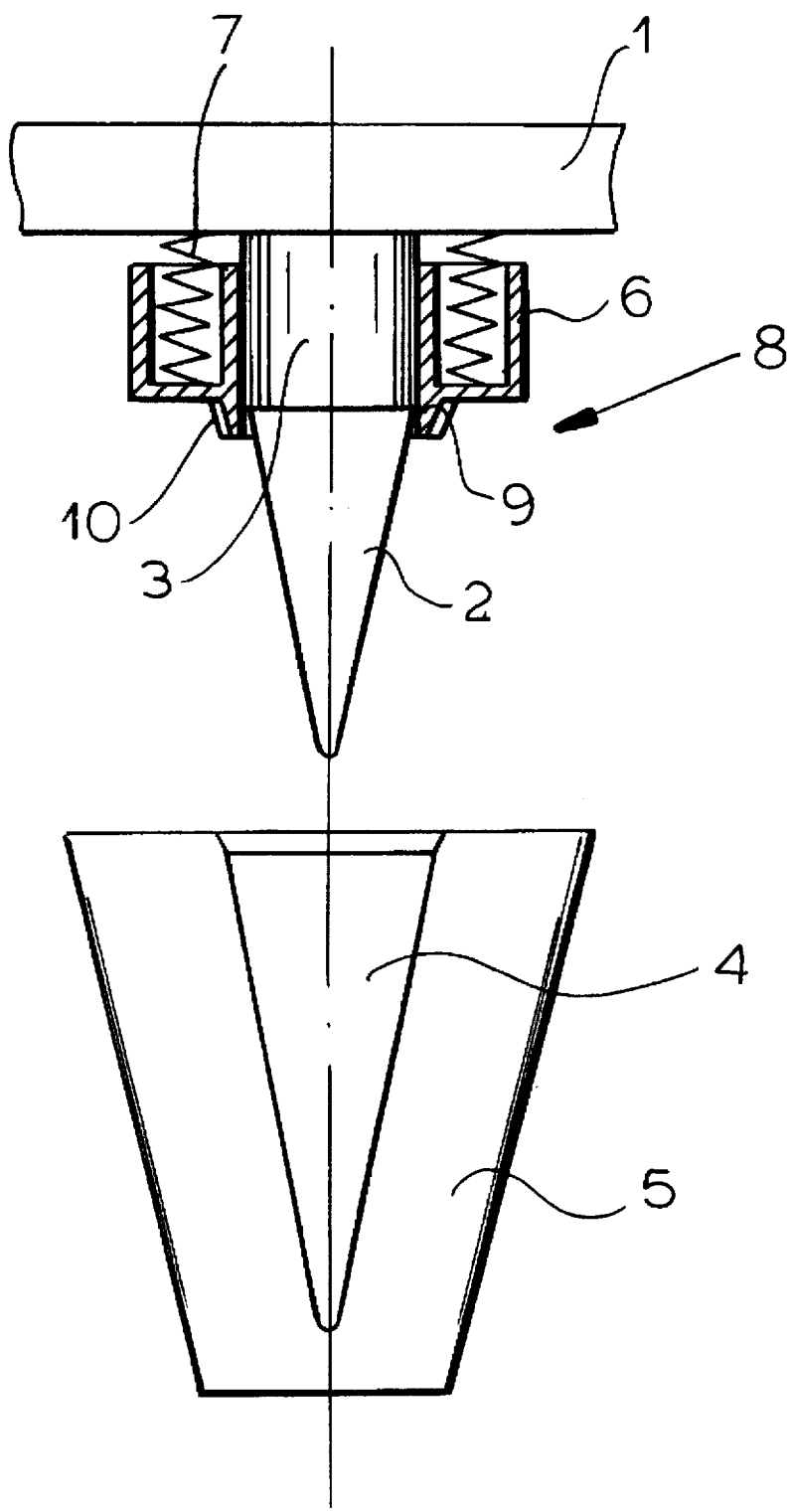
FIG. 1 is a longitudinal cross sectional view of the baking mold according to the invention and shown in an open position.

A composite baking mold according to FIGS. 1 to 4 for the production of a simple ice-cream cone comprises a mold plate 1, to which is solidly attached an essentially conical mold core 2 which changes shape into a guide cylinder 3. The mould core 2, whose shape conforms to the inside shape of an ice-cream cone, projects downwards into a conical recess 4 in the lower part of the mould 5, which can be split axially into two halves. The conical recess 4 conforms in shape to the outside of the ice-cream cone.

In addition, there is a ring-shaped mould component 6 which surrounds the guide-cylinder portion 3 of the mould core 2 and can be moved in the axial direction against the pressure of springs 7. The mould plate 1 with the mould core 2, the guide cylinder 3 and the ring-shaped mould component 5 form the upper part of the mold 8.

When the mold is closed, i.e. the upper part of the mold 8 is brought near to the lower part 5 as far as the position shown in FIG. 4, the conical front surface 9 of the ring-shaped mould component 6 first makes contact with the rim of the recess 4 and rests against it. Slots 10 in the front surface 9 act as air or steam vents of the now closed mold. FIG. 2a shows the mould in this intermediate position. When the mould is closed to its full extent as in FIG. 2b, the mold core projects deep down into the recess 4, until the mold plate 1 comes to rest against the ring-shaped mold component 6 and the springs 7 are fully compressed. The gap between the mold core 2 and the wall of the recess 4 defines the wall thickness of the end product.

The production of an ice-cream cone can now be carried out by filling the recess 4 of the lower part of the mold 5 with an appropriate quantity of liquid wafer dough in the position shown in FIG. 1 and then closing the heated mould as far as shown in FIG. 2a. The mold body is then baked and during this the mold is brought to the compacting final position shown in FIG. 2b. Once the upper part of the mold 8 has been withdrawn and the lower part 5 opened, the end product can be removed. During this, the ring-shaped mould component 6 acts as a mold stripper until the mold core 2 has been withdrawn from the finished product.

A particular process for the production of an edible ice-cream cone from wafer doug is shown in FIGS. 1 to 4. As described above for the simple production process, the lower part of the mold 5 is filled with an appropriate quantity of wafer dough as in FIG. 1. Then, the upper part of the mold 8 is brought down towards the lower part 5 until the ring-shaped component 6 with its conical front surface 9 rests against the rim of the recess 4 and so closes the mold as far as the slots 10. In this position, shown in FIG. 2a, the mold is baked for example for 10 seconds. The mold core 2 is then brought sharply down to its end position (FIG. 2b)

and at once (after 1 to 4 seconds) withdrawn again to a position as in FIG. 3. This quickly brings the already lightly baked product to its final shape and ensures that every hollow space inside the mould is necessarily filled. The mold body is then returned to the position shown in FIG. 2b, in which the gap width between the lower part of the mold 5 and the mold core 2 is about two to three times the wall thickness of the end product, and the actual baking process lasting, for example, 100 seconds can then take place. Finally, the mold core 2 is pushed back down to its end position as in FIG. 4 to compact the product, and final baking for about 60 seconds takes place. As shown in FIGS. 2 to 4, during the pre-baking (FIG. 2a), the sudden lowering of the mold core 2 (FIG. 2b), and the actual baking (FIG. 3) and after-baking stages (FIG. 4), the mold remains closed because the ring-shaped mold component 6 seals it off. Steam may escape through the slots 10 at any time, but dough cannot escape or be forced or sprayed out, even during the sudden thrust of the mold core 2.

As mentioned, the ring-shaped component 6 holds the finished baked product in position in the lower part of the mould 5 while the mold core 2 is being withdrawn, so that the baked product does not adhere to the mold core 2. The lower part of the mold 5 is then axially split and the ready baked product falls out or can be removed. In this production process the above-mentioned pre-bake stage can be omitted, end when the wafer dough has been filled into the recess 4 of the heated lower mold portion 5, the mold core 2 can be thrust down rapidly ("plunged") to distribute the dough even into the remotest corners of the closed mold.

In what follows, a more complex alternative baking mould for an ice-cream cone with a collar-type drip catcher some distance below the mouth of the ice-cream cone will be described.

Figure 5:
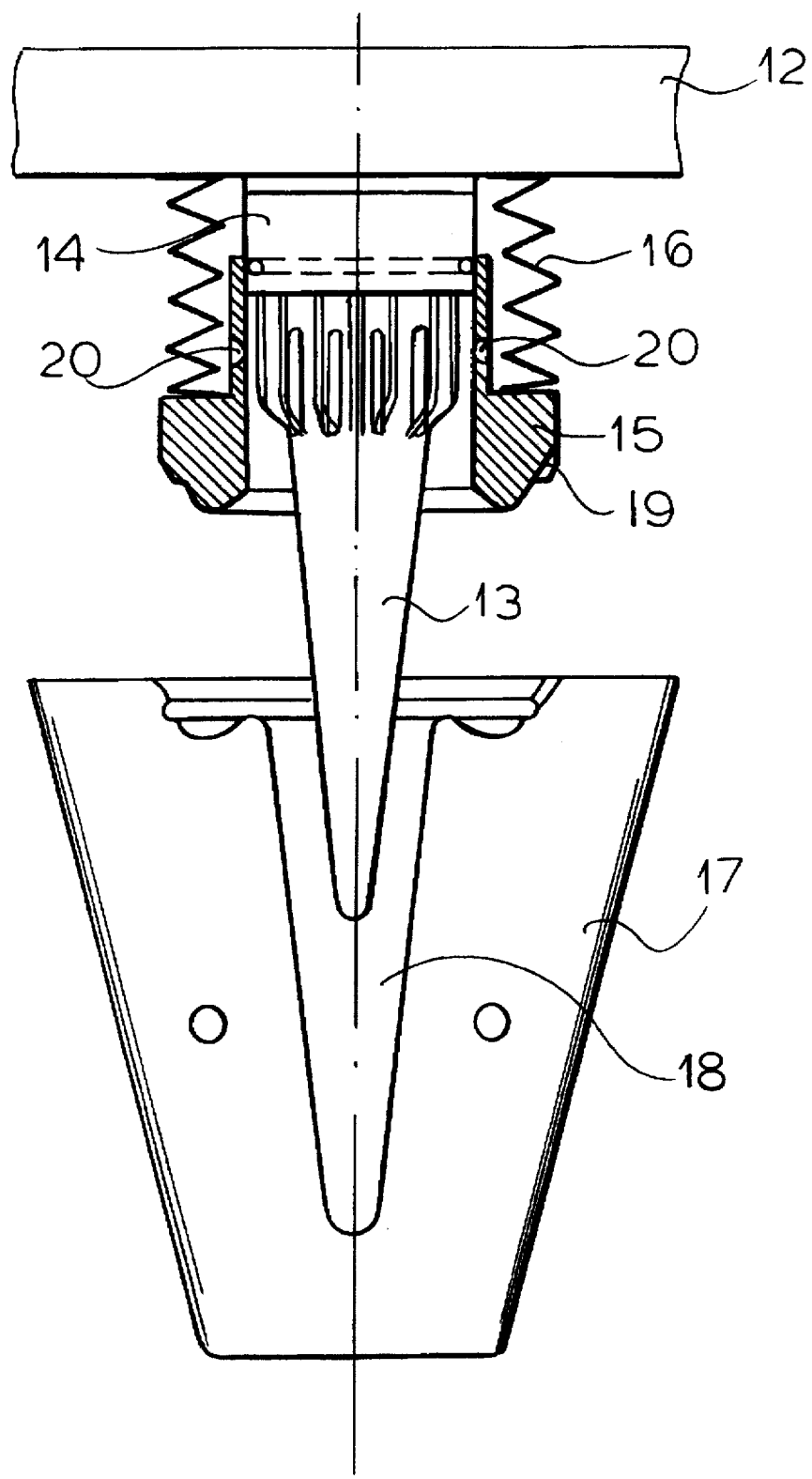
FIG. 5 is a cross-sectional view of the mold in an open position thereof according to another embodiment of the present invention.

A baking mold according to FIGS. 5 to 7, for an ice-cream cone having a cup-like projecting drip catcher approximately two-thirds of the way up the cone, again comprises a mold plate 12 to which a mould core 13 with a guide cylinder 14 is solidly attached. Over the guide cylinder 14 slides a ring-shaped mold component 15. Springs 16 press the ring-shaped component 15 down to a position some distance away from the mould plate 12. End-stops, which prevent the ring-shaped component from falling off, are not shown in FIGS. 1 to 7 for the sake of simplicity. The mould plate 12 can move towards a lower part of the mould 17 that can be split axially into two sections, and whose recess 18 conforms to the outer shape of the conical ice-cream cone and, when a drip catcher is wanted, also forms its underside. FIGS. 5 to 7 show the lower part of the mould 17 sectioned in its vertical plane, with locating pins. The lower part of the mould 17 has an annular groove at the top, whose shape conforms to the underside of the ice-cream cone's dish-like, projecting drip catcher. The front end of the ring-shaped mold component 15 conforms in shape to the negative of the upper side of the ice-cream cone's drip catcher. The cylindrical or slightly conical inner surface of the ring-shaped component 15 conforms in shape to the inside of the upper part of the ice-cream cone next to the cone's mouth. The entire mold core 13 conforms in shape to the inside of the ice-cream cone, whose lower part is conical and whose upper part is approximately cylindrical with internal ribs.

On the front side of the ring-shaped mold component 15 there are one or more slots 19 (e.g. six slots, each 60° away from those on either side), extending radially and forming channels across the closure surface between the lower part of the mold 17 and the ring-shaped component 15, so that when the mold is closed (FIGS. 6,7) steam can escape through them. These slots may also be formed in the closure surface of the lower part of the mold 17. In the ring-shaped component 15 there are also one or more steam vents 20 (e.g. two diametrically opposite holes). On the inside these face the guide cylinder 14, which Seals off the steam vents 20 when the mold is fully closed (FIG. 7).

In what follows, the operating sequence is described with reference to FIGS. 5 to 7:

With the mold open as in FIG. 5, the mold plate 12 is raised far enough clear of the lower part of the mold 17 to allow dough to be placed in the conical recess 18. The mold plate 12 is then brought down towards the lower part of the mold 17 until the front end of the ring-shaped component rests against the upper closure surface of the lower part of the mold 17 (FIG. 6). The spring loading of the ring-shaped component 15 ensures a self-adjusting seal, so that the mold is properly closed. The dough is brought almost to its final shape by the penetration of the mold core 13 and the flow of steam, but the wall thicknesses are all still too large. During the pre-bake stage in the position of FIG. 6 (about 20 seconds) steam escapes both through the steam slots 19 and through the steam vents 20. Owing to the pre-baking and the water loss, the dough sets to a plastic intermediate shape.

The dough mass is now compressed or compacted by bringing the mold plate 12 down to its final position (FIG. 7). The position of the ring-shaped component 13 with respect to the lower part of the mold 17 remains unchanged, but the mold core 13, in penetrating more deeply, compresses the pre-baked dough with its cavities until it reaches its final dimensions. This reduces the cavities and ensures complete baking of the dough. When the mold plate 12 is fully lowered, the outer surface of the guide cylinder 14 on the mould core 13 slides in front of the inner, sharp-edged apertures of the steam vents 20 and closes them off. At the top of the baked product the steam flow direction is then reversed, and any residual steam still present flows towards the steam slots 19, which in the present design example are formed along the horizontal separation surface of the mold, in the ring-shaped component 15, between it and the lower part of the mold 17.

A sealing ring may also be set into the outer surface of the guide cylinder 14.

Removal from the mold can be achieved very advantageously in stages, so that even when the dough used has a high sugar content which tends to make it stick, the ice-cream cone will not be damaged or distorted. When the mould plate 12 is raised from the position of FIG. 7 to that of FIG. 6, the mold core 13 is drawn out from inside the solidified and baked ice-cream cone. The ice-cream cone itself is at first still held in place inside the mold by the ring-shaped component 15. Later, the mold plate 12 also lifts the ring-shaped component 15 clear of the ice-cream cone (FIG. 5), and finally, the two halves of the lower part of the mold 17 ere separated so that the ice-cream cone can fall out. Particularly in the area of the steam slots 19 and vents 20, the mold itself remains completely clean and does not tend to become blocked, because in relation to the steam slots 19 in the separation surface a self-cleaning effect takes place and when the steam has escaped through the steam vents 20 and the mold is pressed closed, the vents are sealed off, whereby the shearing action against the sharp inner edges of the steam vents, which are in that area shaped as conical apertures, also favors the self-cleaning action. With this design, the process as described with reference to FIGS. 1 to 4 can also be used.

The guide cylinder 3 or 14 described in relation to FIGS. 1 to 7 can be designed as a circular cylinder, but also as a body with an outer surface of mutually parallel generatrices, which conform —apart from a circle—to an oval, a rectangle or the like, as its basic curve.

I claim:

1. A composite baking mold comprising:

a lower part provided with an opening centered along an axis, said opening receiving a wafer dough and being formed with a peripheral surface;

an upper part formed with:

a mold plate, a mold core mounted on said mold plate and extending axially downwardly toward and coaxial with said opening of said lower part, said mold core being formed with:

a guide cylinder on said mold plate, and a conical core extending axially downwardly from said guide cylinder and having an outer surface tapering towards said lower mold part, a ring-shaped component mounted coaxially with and slidably on said mold core and extending radially outwardly therefrom, said ring component being formed with a lower annular shoulder, means forming at least one passage in a bottom of said ring-shaped component, a compression spring braced between said mold plate and said bottom of said ring-shaped component; and means for selectively axially displacing said upper and lower parts relative one another between a fully withdrawn position and a fully engaged position, said outer surface of the conical core and said peripheral surface of the opening defining a cavity therebetween conforming a desired configuration of goods to be baked in said fully engaged position in which said upper part is biased against said lower part by said compression spring preventing thereby escape of the dough from said cavity but allowing steam to evacuate through said one passage during the baking process.

2. The baking mold defined in claim 1 wherein said bottom of said ring component is formed with an annular flange having said passage and extending into said cavity for sealing off said lower part of the mold in said fully engaged position.

3. The baking mold defined in claim 1, wherein said passage is closable.

4. The baking mold defined in claim 1 wherein said lower part of the mold is axially splittable in said withdrawn position, said lower part further being formed with a dish-like drip catcher extending toward said upper part of the mold and having a respective upper surface, said bottom of the ring-shaped component being formed with a surface complementing the upper surface of the dish-like catcher in the engaged position.

5. The baking mold defined in claim 1 wherein said ring-shaped component being formed with a second passage spaced axially upwardly from said one passage, said guide cylinder sealing said second passage in said fully engaged position of said parts.

6. The baking mold defined in claim 1 wherein said mold core and said ring-shaped component are made of different materials including brass and steel.

7. The baking mold defined in claim 1 wherein displacement of said upper and lower parts are controllably stopped in an intermediate position between said withdrawn and engaged positions, said ring-shaped component holding the baked good within said cavity in said intermediary position.

8. A process for baking goods from a wafer dough in a baking mold including a lower part formed with an opening centered on an axis and an upper part provided with:

a mold core coaxial with said opening and formed with a cylinder part and a conical part, a ring-shaped component mounted axially slidably on and extending radially outwardly from said cylinder part, and a compression spring operatively connected with said component and exerting a force directed axially downwardly toward said lower part, said process comprising the steps of:

a) filling the opening of the lower part with the wafer dough;

b) bringing the lower and upper parts of the baking mold in an intermediary position, so that the ring-shaped component of the upper part is urged against the lower part by the spring, thereby closing the opening of the lower part of the baking mold and forming a cavity defined between respective surfaces of the conical part and opening and having a gap width corresponding to 2–3 times a wall thickness of a finished good to be baked;

c) thereafter pre-baking the wafer dough contained in the cavity for approximately 10 sec;

d) thereafter pushing said upper and lower parts further toward one another in a fully closed position, so that a width of said cavity corresponds to a final thickness of the good to be baked, and maintaining said fully closed position for at most 4 seconds;

e) thereafter pulling said parts away from one another back to the intermediary position defined in step (b) and baking the wafer dough for approximately 100 seconds;

f) thereafter displacing the parts towards one another in the fully closed position defined in step (d) and baking the wafer dough for approximately another 60 seconds;

g) displacing the lower and upper parts away from each other while holding the baked good in the lower part by the ring-shaped component until a distance between the mold parts is greater than a travel path of the ring-shaped component along the mold core; and h) thereafter splitting said lower part along said axis.

\* \* \* \* \*